UNITED STATES PATENT OFFICE.

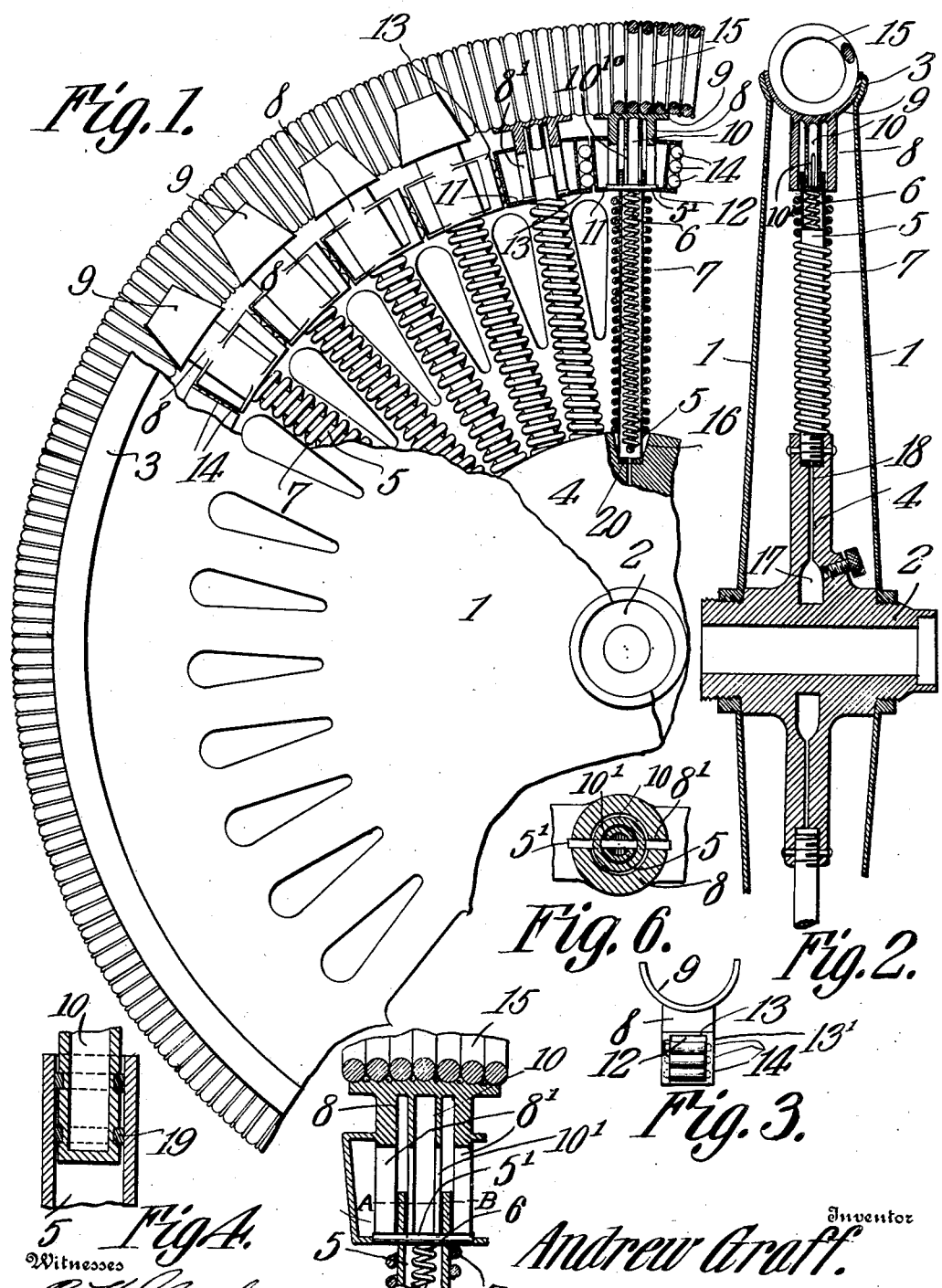

ANDREW GRAFF, OF WELLINGTON, KANSAS.

VEHICLE-WHEEL.

943,112.  Specification of Letters Patent.  Patented Dec. 14, 1909.

Application filed June 2, 1908. Serial No. 436,297.

*To all whom it may concern:*

Be it known that I, ANDREW GRAFF, a citizen of the United States, residing at Wellington, in the county of Sumner and State of Kansas, have invented a new and useful Vehicle-Wheel, of which the following is a specification.

This invention relates to vehicle wheels and is more particularly an improvement upon the wheel described and claimed in Patent #895,554, issued to me on August 11th, 1908.

The object of the invention is to provide an improved construction wherein the spokes are provided with movably connected rim sections having anti-friction bearings therebetween whereby the spokes are held positively spaced apart at their outer ends without, however, interfering with the flexibility of the tread.

A further object is to provide novel means for movably connecting each spoke with its rim section.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a view partly in section and partly in elevation of a portion of a wheel embodying the present improvements. Fig. 2 is a transverse section through a portion of the wheel. Fig. 3 is an end view of one of the rim sections. Fig. 4 is an enlarged section through the outer end of one of the spokes and a portion of the stem projecting thereinto. Fig. 5 is a section showing a modified construction. Fig. 6 is a section on the line A—B of Fig. 5.

Referring to the figures, by characters of reference, 1, 1 designates yieldable disks or shields screwed or otherwise fastened upon the end portions of the wheel hub 2 and provided at their peripheries with flared portions 3 constituting centering means for the tread of the wheel. An annular flange 4 is formed upon the hub and between the guard disks 1 and radiating from this hub is a series of tubular spokes 5 each of which contains a coiled spring 6 and is surrounded by a coiled spring 7. Each spring 7 extends toward the outer end of each spoke and normally bears against a sleeve 8 extending from the middle portion of a yoke 9. A central tubular stem 10 is located within the sleeve and has its ends closed and this tube is designed to bear against the spring 6. The spoke 5 preferably projects into the sleeve 8 so as to surround the end portion of stem 10, but the spoke does not fit tightly around said stem.

Registering slots 8' and 10' are formed within the sleeve 8 and the stem 10, respectively, at diametrically-opposite points. A retaining pin 5' is secured within and extends beyond opposite portions of the spoke near its outer end, said pin constituting an abutment for the springs 6 and 7 and designed to work within the slots 8' and 10'. Each sleeve 8 has extensions projecting in opposite directions therefrom, as indicated at 11 and 12, and the outer faces of these extensions are flat and extend radially of the wheel. One extension of each sleeve has flanges 13 extending therearound so as to form a socket to receive one or more anti-friction rollers 14. When the parts of the wheel are assembled the rollers 14 of each section are designed to bear upon the adjoining flat face 11 of the adjoining section. When the rim sections are thus assembled they extend continuously around the wheel so as to hold the spokes properly spaced apart. The yokes 9 are arranged normally in a circle and constitute seats for a wire helix 15 constituting an elastic tread or tire for the wheel. This tread may be constructed of one or more coils, and is held properly centered by the peripheral flared portions 3 of the disks 1.

When the tire of the wheel is pressed inwardly under the weight of the load the rim sections in the line of pressure will be forced against those of the springs 6 and 7 bearing thereagainst, and as more or less lateral play is permitted between each spoke and its rim section it will be obvious that this inward movement of the rim sections will be permitted. By interposing the anti-friction rollers between the sections there is no danger of the rim sections becoming wedged so that the springs 6 and 7 can not return them to their initial positions after they have been pressed inwardly. In order to provide additional means for permitting independent radial movement of the rim sections the spokes 5 can be pivoted in sockets 16 in flanges 4 so as to have independent swinging movement.

If deemed desirable, any suitable means may be utilized for preventing the rollers 14 from dropping out of their proper positions should the relative movements of the rim sections be very extensive. One means of accomplishing this result has been illustrated in Fig. 3 and consists of flanges 13' extending inwardly from the side flanges 13, the ends of the rollers being reduced so as to form necks extending back of these flanges.

In order that friction between the working parts of the spokes may be reduced to the minimum an oil compartment 17 may be formed within the hub of the wheel and provided with outlet ducts 18, each leading to one of the sockets 6 so that oil after being placed within the compartment 17 will be free to flow into the various spokes and thus reduce friction at the point where the stems 10 project into them. Leakage at these bearing points may be prevented by providing the stem 10 with packing rings 19, as indicated particularly in Fig. 4. Leakage at the inner ends of the spokes can also be prevented by means of resilient washers 20 or in any other suitable manner.

The rollers 14 may be made of rubber so as to yield and permit the necessary movement of the rim sections toward each other.

What is claimed is:

1. A wheel comprising a hub, spokes radiating therefrom, rim sections movably mounted upon the spokes, cushioning springs therefor, an elastic tire, and superposed anti-friction devices loosely supported by and interposed between the rim sections and spacing said sections apart in the direction of the circumference of the wheel, said devices extending transversely of the wheel.

2. A wheel comprising a hub, tubular spokes radiating therefrom, and a rim section movably mounted upon each spoke, each section comprising a sleeve surrounding the spoke, a stem projecting into the spoke, and oppositely projecting bearing extensions upon the sleeve, cushioning springs for the sections, and anti-friction devices interposed between said extensions and supported by them, said devices constituting means for spacing the sections apart in the direction of the circumference of the wheel.

3. A wheel comprising a hub, spokes radiating therefrom, a circular helix constituting an elastic tire, yokes constituting seats for the helix, separate means extending from each yoke for projecting into and for surrounding one of the spokes, separate springs within and around each spoke for bearing against said means, and oppositely projecting bearing extensions movable with each yoke and, with the yoke and the spoke engaging means, constituting a rim section, and anti-friction devices interposed between the rim sections.

In testimony that I claim the foregoing as my own, I have hereto affixed my signature in the presence of two witnesses.

ANDREW GRAFF.

Witnesses:
E. G. O'BRIEN,
S. M. BICK.